(12) United States Patent
Cushing et al.

(10) Patent No.: US 11,235,877 B2
(45) Date of Patent: Feb. 1, 2022

(54) PAYLOAD MECHANISM

(71) Applicant: BAE Systems plc, London (GB)

(72) Inventors: James David Cushing, Preston (GB); Andrew Charles White, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/290,923

(22) PCT Filed: Oct. 29, 2019

(86) PCT No.: PCT/GB2019/053044
§ 371 (c)(1),
(2) Date: May 3, 2021

(87) PCT Pub. No.: WO2020/095025
PCT Pub. Date: May 14, 2020

(65) Prior Publication Data
US 2021/0354823 A1 Nov. 18, 2021

(30) Foreign Application Priority Data

Nov. 6, 2018 (EP) ..................................... 18275171
Nov. 6, 2018 (GB) ..................................... 1818092

(51) Int. Cl.
*B64D 1/06* (2006.01)
(52) U.S. Cl.
CPC ..................................... *B64D 1/06* (2013.01)
(58) Field of Classification Search
CPC ... B64D 1/06; B64D 1/10; B64D 1/12; B64D 1/04; B64D 9/00; B64C 1/22; F41F 3/06; B60P 1/00; B60P 3/00; B65G 7/00
See application file for complete search history.

(56) References Cited

U.S. PATENT DOCUMENTS 2,856,181 A * 10/1958 Burrell ..................... B64D 1/06
49/253
3,765,626 A * 10/1973 Maynard ................. F16L 39/04
244/129.5
(Continued)

FOREIGN PATENT DOCUMENTS

| GB | 767043 A | 1/1957 |
| GB | 877448 A | 9/1961 |
| GB | 2519362 A | 4/2015 |

OTHER PUBLICATIONS

International Search Report and Written Opinion for PCT Appl. No. PCT/GB2019/053044, dated Jan. 22, 2020, 11 Pages.
(Continued)

*Primary Examiner* — Medhat Badawi
*Assistant Examiner* — Vicente Rodriguez
(74) *Attorney, Agent, or Firm* — Maine Cernota & Rardin

(57) ABSTRACT

A payload mechanism for a vehicle is provided. The payload mechanism comprises: a door (2) operable to be in a closed configuration or an open configuration within a recess of the vehicle, the recess having an aperture (10); a first bearing unit comprising a first bearing (3a) and a second bearing (4a), the first bearing unit being coupled to one end of the door such that the door can rotate about the axis of rotation (y) of the first bearing and wherein the first bearing unit can rotate about the axis of rotation (x) of the second bearing, wherein the axis of rotation of the first bearing is offset from the axis of rotation of the second bearing; and a drive unit arranged to selectively drive either: the first bearing and the second bearing simultaneously at opposite and equal angular rates of motion to rotate the door in a first direction about the axis of rotation of the first bearing and to rotate the first bearing unit in a second direction about the axis of rotation of the second bearing to move the door closer to or away from the aperture, or the first bearing but not the second (Continued)

bearing to rotate the door about the axis of rotation of the first bearing. Methods of operating said payload mechanism are also provided, along with a vehicle having the payload mechanism.

19 Claims, 6 Drawing Sheets

(56) References Cited

U.S. PATENT DOCUMENTS

| | | | | | |
|---|---|---|---|---|---|
| 4,333,384 | A | * | 6/1982 | Arnold | B64D 1/06 244/137.4 |
| 4,475,436 | A | * | 10/1984 | Campbell | F41A 9/27 89/1.804 |
| 4,637,292 | A | * | 1/1987 | Peterson | B64D 7/08 89/1.804 |
| 5,257,758 | A | | 11/1993 | Hassel | |
| 6,679,454 | B2 | * | 1/2004 | Olsen | B64C 1/22 244/137.1 |
| 10,017,250 | B2 | * | 7/2018 | Colosimo | B64D 1/06 |
| 2003/0192992 | A1 | * | 10/2003 | Olsen | B64D 9/00 244/137.1 |

OTHER PUBLICATIONS

Search Report for British Patent Appl. No. 1818092.7, dated May 8, 2019, 4 Pages.
Search Report for European Patent Appl. No. 18275171.9, dated May 7, 2019, 5 Pages.

* cited by examiner

Side view

End view

PAYLOAD MECHANISM

RELATED APPLICATIONS

This application is a national phase application filed under 35 USC § 371 of PCT Application No. PCT/GB2019/053044 with an International filing date of Oct. 29, 2019, which claims priority of GB Patent Application 1818092.7 filed on Nov. 6, 2018 and EP Patent Application 18275171.9 filed on Nov. 6, 2018. Each of these applications is herein incorporated by reference in its entirety for all purposes.

FIELD OF THE INVENTION

The present invention relates to a payload mechanism, more specifically a payload mechanism for a vehicle, and methods of operating a payload mechanism.

BACKGROUND ART

Present payload bay doors, for example those found on aircraft, tend to open outwards on hinges such that a payload can be released, exposed or extended. There are several problems associated with these payload bay doors. For example, opening a door into airflow causes the load on that door to increase. There is also an increase in noise and drag on the vehicle.

It is therefore advantageous to provide a new type of mechanism for use on a vehicle that solves the aforementioned problems.

SUMMARY

According to an aspect of the present invention, there is provided a payload mechanism for a vehicle, the payload mechanism comprising:
  a door operable to be in a closed configuration or an open configuration within a recess of the vehicle, the recess having an aperture;
  a first bearing unit comprising a first bearing and a second bearing, the first bearing unit being coupled to one end of the door such that the door can rotate about the axis of rotation of the first bearing and wherein the first bearing unit can rotate about the axis of rotation of the second bearing, wherein the axis of rotation of the first bearing is offset from the axis of rotation of the second bearing; and
  a drive unit arranged to selectively drive either:
    the first bearing and the second bearing simultaneously at opposite and equal angular rates of motion to rotate the door in a first direction about the axis of rotation of the first bearing and to rotate the first bearing unit in a second direction about the axis of rotation of the second bearing to move the door closer to or away from the aperture, or
    the first bearing but not the second bearing to rotate the door about the axis of rotation of the first bearing.

The axes of rotation of the first bearing and second bearing may be parallel to the longitudinal axis of the door.

The drive unit may comprise a first motor for driving the first bearing and a second motor for driving the second bearing.

The payload mechanism may comprise a controller configured to move the door from the closed configuration to the open configuration by performing the steps of:
  driving the first bearing and second bearing simultaneously at opposite and equal angular rates of motion to rotate the door in a first direction about the axis of rotation of the first bearing and to rotate the first bearing unit in a second direction about the axis of rotation of the second bearing, such that the door is moved away from the aperture, and
  driving the first bearing but not the second bearing to rotate the door about the axis of rotation of the first bearing.

The controller may further be configured to perform the step of locking the second bearing such that the first bearing unit cannot rotate about the axis of rotation of the second bearing.

The payload mechanism may further comprise:
  a second bearing unit comprising third and fourth bearings, the second bearing unit being coupled to the opposite end of the door, wherein the axis of rotation of the third bearing is arranged coaxially with the axis of rotation of the first bearing and wherein the axis of rotation of the fourth bearing is arranged coaxially with the axis of rotation of the second bearing,
  wherein the drive unit is arranged to selectively drive either:
    the first bearing and the second bearing simultaneously at opposite and equal angular rates of motion and the third bearing and the fourth bearing simultaneously at opposite and equal angular rates of motion to move the door closer to or away from the aperture, the angular rate of motion of the third bearing being the same as the angular rate of motion of the first bearing, or
    the first bearing simultaneously with the third bearing, but not the second bearing or the fourth bearing, to rotate the door about the axis of rotation of the first bearing and the third bearing.

The inside surface of the door may comprise a payload, wherein in the closed configuration the inside surface of the door faces the inside of the vehicle and in the open configuration the inside surface of the door faces an environment outside of the vehicle.

The payload may be a user-operable control device. Alternatively, the payload may be a sensor or a munition.

The door may comprise:
  a land for engaging with the body of the vehicle when the door is in the closed configuration;
  an inside surface; and
  an outside surface,
wherein, in the closed configuration, the outside surface of the door is flush with an outside surface of the body.

According to a second aspect of the present invention, there is provided a vehicle comprising:
  a body having a recess, the recess comprising an aperture; and
  the payload mechanism according to the first aspect, wherein the payload mechanism is disposed inside or integrated with the recess.

The recess may be a weapons bay of an aircraft.

According to a third aspect of the present invention, there is provided a method of operating a payload mechanism according to the first aspect to expose a payload, the method comprising:
  driving the first bearing and second bearing simultaneously at opposite and equal angular rates of motion to rotate the door in the first direction about the axis of rotation of the first bearing and to rotate the first bearing unit in the second direction about the axis of rotation of the second bearing to move the door away from the aperture; and driving the first bearing but not the second bearing to rotate the door about the axis of rotation of the first bearing.

The method may comprise locking the second bearing such that the first bearing unit cannot rotate about the axis of rotation of the second bearing. Locking the second bearing may comprise preventing rotation of the second motor. Alternatively, locking the second bearing may comprise clamping the second bearing.

Driving the first bearing may comprise driving a first motor, and driving the second bearing may comprise driving a second motor.

The method may comprise:
driving the first bearing and the second bearing simultaneously at opposite and equal angular rates of motion and the third bearing and the fourth bearing simultaneously at opposite and equal angular rates of motion to move the door away from the aperture, wherein the angular rate of motion of the third bearing is the same as the angular rate of motion of the first bearing; and
driving the first bearing simultaneously with the third bearing but not the second or fourth bearings to rotate the door about the axis of rotation of the first and third bearings.

According to a fourth aspect of the present invention, there is provided a method of operating a payload mechanism according to the first aspect to inter a payload within the body of a vehicle, the method comprising:
driving the first bearing but not the second bearing to rotate the door about the axis of rotation of the first bearing; and
driving the first bearing and the second bearing simultaneously at opposite and equal angular rates of motion to rotate the door in the second direction about the axis of rotation of the first bearing and to rotate the first bearing unit in the first direction about the axis of rotation of the second bearing to move the door closer to the aperture.

Driving the first bearing may comprise driving a first motor, and wherein driving the second bearing may comprise driving a second motor.

The method may comprise unlocking the second bearing to allow the first bearing unit to rotate about the axis of rotation of the second bearing. Unlocking the second bearing may comprise allowing rotation of the second motor. Alternatively, unlocking the second bearing may comprise unclamping the second bearing.

The method may comprise:
driving the first bearing simultaneously with the third bearing but not the second or fourth bearings to rotate the door about the axis of rotation of the first and third bearings; and
driving the first bearing and the second bearing simultaneously at opposite and equal angular rates of motion and the third bearing and the fourth bearing simultaneously at opposite and equal angular rates of motion to move the door closer to the aperture, wherein the angular rate of motion of the third bearing is the same as the angular rate of motion of the first bearing.

The method may comprise locking the second bearing and fourth bearing such that the first bearing unit and the second bearing unit cannot rotate about the axis of rotation of the second and fourth bearings, and unlocking the second and fourth bearings after the door has rotated.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

DETAILED DESCRIPTION

Embodiments described herein relate to a payload mechanism for exposing a payload or interring the payload within the body of a vehicle. Particularly, in one embodiment the payload mechanism is disposed inside or integrated with a weapons bay of an aircraft. Eccentric pairs of geared rings (or bearing rings, herein generally referred to as "bearings") are provided in a compact installation, allowing translation and rotation of a rotary door. The payload mechanism provides a door for an aperture in the vehicle's body that does not interfere with the axes of rotation of the journals causing its translation or rotation, and ease of access to the weapons bay through the axes of rotation.

Figure 1A:
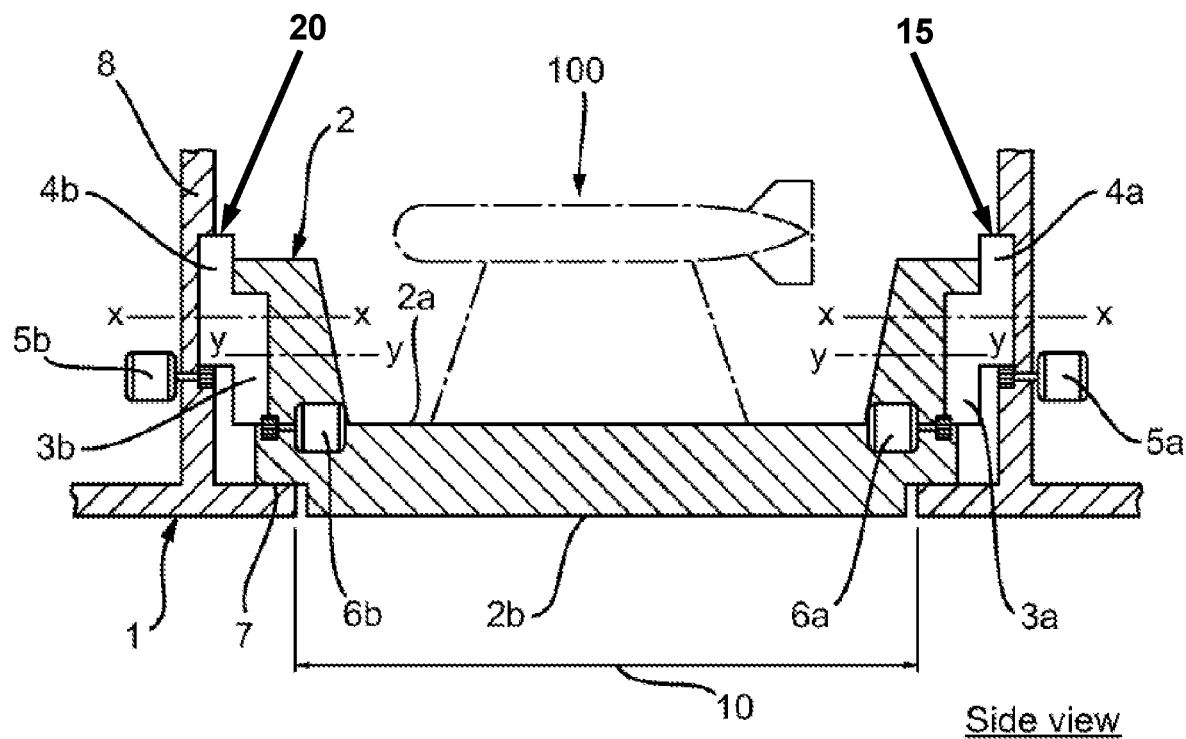
FIGS. 1a and 1b are cross-sectional views through the side and end of the payload mechanism respectively when it is in a closed configuration.
Figure 1B:
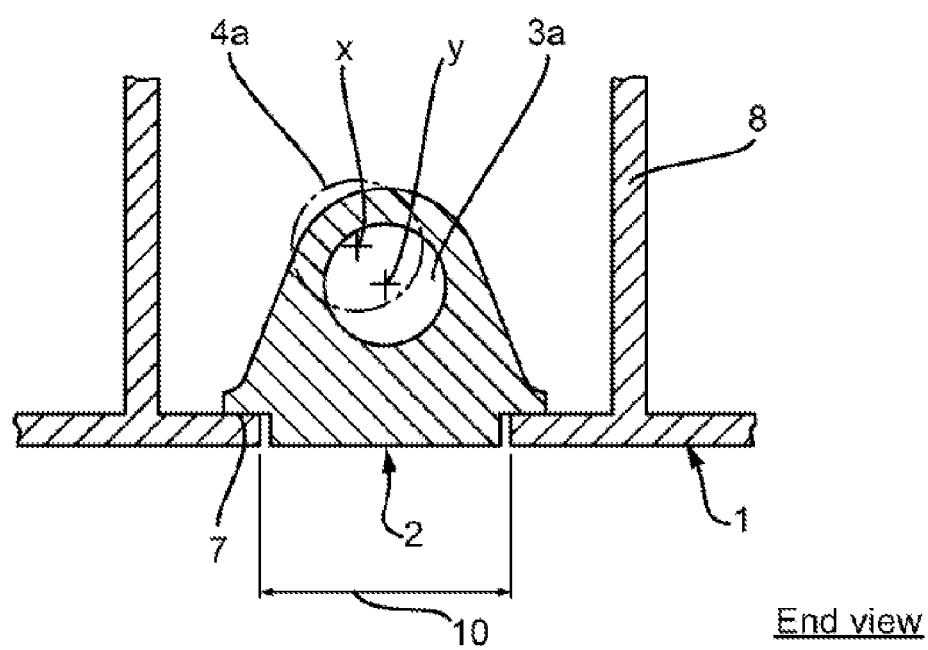

FIGS. 1a and 1b show a payload mechanism in a closed configuration. FIG. 1a shows a side view and FIG. 1b shows an end view of the payload mechanism. In the illustrated embodiment, the aperture 10 through which the payload 100 is to be exposed is elongate in form. The aperture 10 is formed in the body 1 of a vehicle, such as a car, ship or aircraft. For example, the body 1 is an airframe. The aperture 10 in the embodiment shown in FIGS. 1a and 1b is an opening of a weapons bay of an aircraft. The aperture 10 in this embodiment is about 4 metres long. The weapons bay is a recess having a set of four surrounding walls 8. A roof of the recess is disposed opposite the aperture 10. The aperture 10 is in the lower skin of the fuselage of the aircraft. The aperture 10 shown is a rectangle, but the payload mechanism can be applied to work with apertures of any shape, such as a circle, hexagon or square. On either side of aperture 10 are first bearing unit 15 and second bearing unit 20.

Here, in the closed configuration, a rotatable and translatable door 2 seals the aperture 10. The door 2 includes a horizontal cross-member having a shape corresponding to the aperture 10 for sealing the aperture 10 when in the closed configuration. The door 2 further includes a pair of vertical support members coupled on opposite sides of the horizontal cross-member. The support members are disposed opposite each other. In some embodiments, there is only one vertical support member coupled to the horizontal cross-member, but here the horizontal cross-member is constrained on the end opposite the supporting member by e.g. a frame or wall 8 of the bay/recess within the body 1 of the vehicle, such that the door 2 does not trace a cone as it moves during operation.

An outside surface 2b of the cross-member lies flush with the outside surface of the body 1 of the vehicle when the door 2 is in the closed configuration. To improve the seal of the aperture 10 and reduce discontinuity between the outside surface 2b of the door 2 and the body 1, the outside surface 2b includes a stepped land 7 along each edge to engage with the body 1 at an inside surface of the body 1. This tends to reduce drag on the body 1 of the vehicle and reduce noise caused by air flowing over the surface of the body 1. Instead of a step having orthogonal planar members, the land 7 may be slanted at an angle corresponding to the angle of the edge of the aperture 10.

While the inside surface 2a and outside surface 2b are shown here to be planar, in some embodiments they may be concave, convex or a combination thereof. Particularly, the shape of the outside surface 2b may be chosen to match the contours of the body 1 of the vehicle in the vicinity of the aperture 10 when the payload mechanism is in the closed configuration. Further, the inside surface 2a shape may be chosen to match the contours of the body 1 of the vehicle in the vicinity of the aperture 10 when the payload mechanism is in the open configuration.

The payload mechanism includes a first bearing unit, and optionally a second bearing unit. The first bearing unit comprises a first bearing 3a and a second bearing 4a. The first bearing unit is coupled to one of the support members. The second bearing unit is coupled to the support member directly opposite the support member having the first bearing unit coupled to it. The second bearing unit comprises a third bearing 3b and a fourth bearing 4b. Each of the bearings 3a, 4a, 3b, 4b are about 0.5 metres in diameter.

The bearings 3a, 3b, 4a, 4b are geared rings (or toothed wheels). In other words, the inside surface of the bearings 3a, 3b, 4a, 4b include teeth for engaging with teeth of motors, or spindles coupled thereto, extend into the respective bearing (i.e. a circular rack and pinion). The bearings 3a, 3b, 4a, 4b can be driven by other means, such as a belt. In other embodiments, one bearing, such as the second bearing 4a may be driven by a different driving mechanism to another bearing, such as the first bearing 3a. In other words, the second bearing 4a may be belt driven while the first bearing 3a is geared.

The axes of rotation y of the first bearing 3a and third bearing 3b are co-axial. In other words, the first bearing 3a and third bearing 3b share the same axis of rotation y. The axes of rotation x of the second bearing 4a and fourth bearing 4b are co-axial. In other words, the second bearing 4a and fourth bearing 4b share the same axis of rotation x. Axis of rotation x and axis of rotation y are parallel and offset from each other. The door 2 is arranged to rotate about the axis of rotation y of the first bearing 3a. The bearing units, having the door 2 rotably attached thereto, are arranged to rotate about the axis of rotation x of the second bearing 4a and fourth bearing 4b.

There may not be a second bearing unit, for example where there is only one support member. In embodiments not having support members at all, the first and second bearing units are coupled to opposite ends of the horizontal cross-member.

The door 2 contains a first motor 6a for driving the door around the first bearing 3a. Further, but optionally, the door 2 contains a second motor 6b for driving the door around the third bearing 3b. Instead, the first motor 6a may drive the door around the first and third bearings 3a, 3b simultaneously using associated shafts.

The motors 6a, 6b, along with motors later described, may be electric, hydraulic or pneumatic motors. The motors 6a, 6b may variously be coupled to the first and third bearings 3a, 3b by a belt, shaft or bearing to move the motors 6a, 6b around the bearings 3a, 3b. In other words, the motors 6a, 6b may comprise spindles for extending out of the door 2 and into respectively the first and third bearings 3a, 3b such that the door 2 rotates about the axis of the bearings 3a, 3b. The motors 6a, 6b (and later described motors 5a, 5b) may be arranged to operate the drive mechanism (i.e. the bearing units) through a reduction gear arrangement, whereby a bearing 3a, 3b, 4a, 4b within the drive mechanism is braked (locked) by stopping the respective motor 5a, 5b, 6a, 6b. This reduction gear arrangement may be a worm drive or a low gear ratio, which will provide accurate positioning but which will not permit reverse driving of the respective motor. In some embodiments, the reduction gear arrangement includes a clutch for disengaging a respective bearing 3a, 3b, 4a, 4b from the respective motor 5a, 5b, 6a, 6b if there is a fault. The first motor 6a and second motor 6b are fixed to the door 2 such that they do not move relative to the door 2.

The payload mechanism having the door 2 is disposed inside a recess of the body 1 of the vehicle. For example, the recess is disposed inside the weapons bay of an aircraft. Here, the inside surface 2a of the cross-member includes a hardpoint, such as a pylon, for coupling a releasable payload 100 such as a weapon to the door 2. The weapon can include a torpedo, bomb, cannon pod, missile, rocket, rocket pod or laser directed energy weapon.

In other embodiments, the payload mechanism is for exposing or interring a non-releasable payload 100 of a vehicle, either for cosmetic reasons or to reduce drag on the vehicle or noise generated as it passes through water or air. For example, the payload 100 may be coupled directly to the inside surface 2a of the door 2 and may include an antenna, door handle, switch, spare wheel, spoiler, sensor (e.g. a camera or radar/sonar array), artwork, or a machine gun/cannon. In one embodiment, the payload mechanism may be disposed in a recess in a car door. When the payload mechanism is in the closed configuration, the outside surface 2b of the door 2 is flush with the car door to give is a smooth and continuous appearance. In the open configuration, the inside surface 2a of the payload mechanism's door 2 is exposed to allow access to a door handle 100 affixed thereto. The door handle 100 can then be used to open the car door. Equally, the payload mechanism may be disposed in a recess in the dorsal spine of an aircraft fuselage. In the closed configuration, the outside surface 2b of the door 2 is flush with the fuselage to improve its aerodynamic performance. In the open configuration, the inside surface 2a of the payload mechanism's door 2 is exposed to expose an antenna affixed thereto to allow the aircraft to communicate with a ground station or other entity.

In another embodiment, the payload mechanism may further include a second cross-member disposed opposite to the first cross-member (the cross-member previously described) and coupled to the support members. Here, the payload 100 is coupled to an outside surface of the second cross-member instead of the first cross-member. The first and second cross-members are arranged such that in the closed configuration the outside surface 2*b* of the first cross-member is arranged flush with the body 1 and in the open configuration the outside surface of the second cross-member is arranged flush with the body 1. Instead again, a planar structure may surround the payload 100, such that in the open configuration the payload 100 is flush with the body 1 of the vehicle around the aperture 10. In other words, a second cross-member may be provided to seal the aperture 10 when the payload 100 is exposed.

In one embodiment, the payload mechanism is a stand-alone device. Here, the door 2 is disposed inside a fixed frame which can be retrofitted or installed in any suitably sized recess. Here, the support members of the door 2 engage with the frame. In other embodiments, the payload mechanism is integrally formed within a recess of the body 1. Here, the walls 8 of the recess engage with the support members of the door 2. The walls 8 of the frame or recess adjacent and proximate to the support members (i.e. the walls 8 in the same plane as the respective support members) are coupled to the second bearing 4*a* and the fourth bearing 4*b*.

The recess includes a third motor 5*a* for driving the second bearing 4*a* and a fourth motor 5*b* for driving the fourth bearing 4*b*. In another embodiment, the second bearing 4*a* and fourth bearing 4*b* are driven by the same motor 5*a* by means of linked shafts, and so there is no fourth motor 5*b*. The third motor 5*a* and fourth motor 5*b* do not move relative to the recess. The third motor 5*a* and fourth motor 5*b* comprise elongate spindles for extending out of the recess and into respectively the second and fourth bearings 4*a*, 4*b* of the first and second bearing units.

Figure 1C:
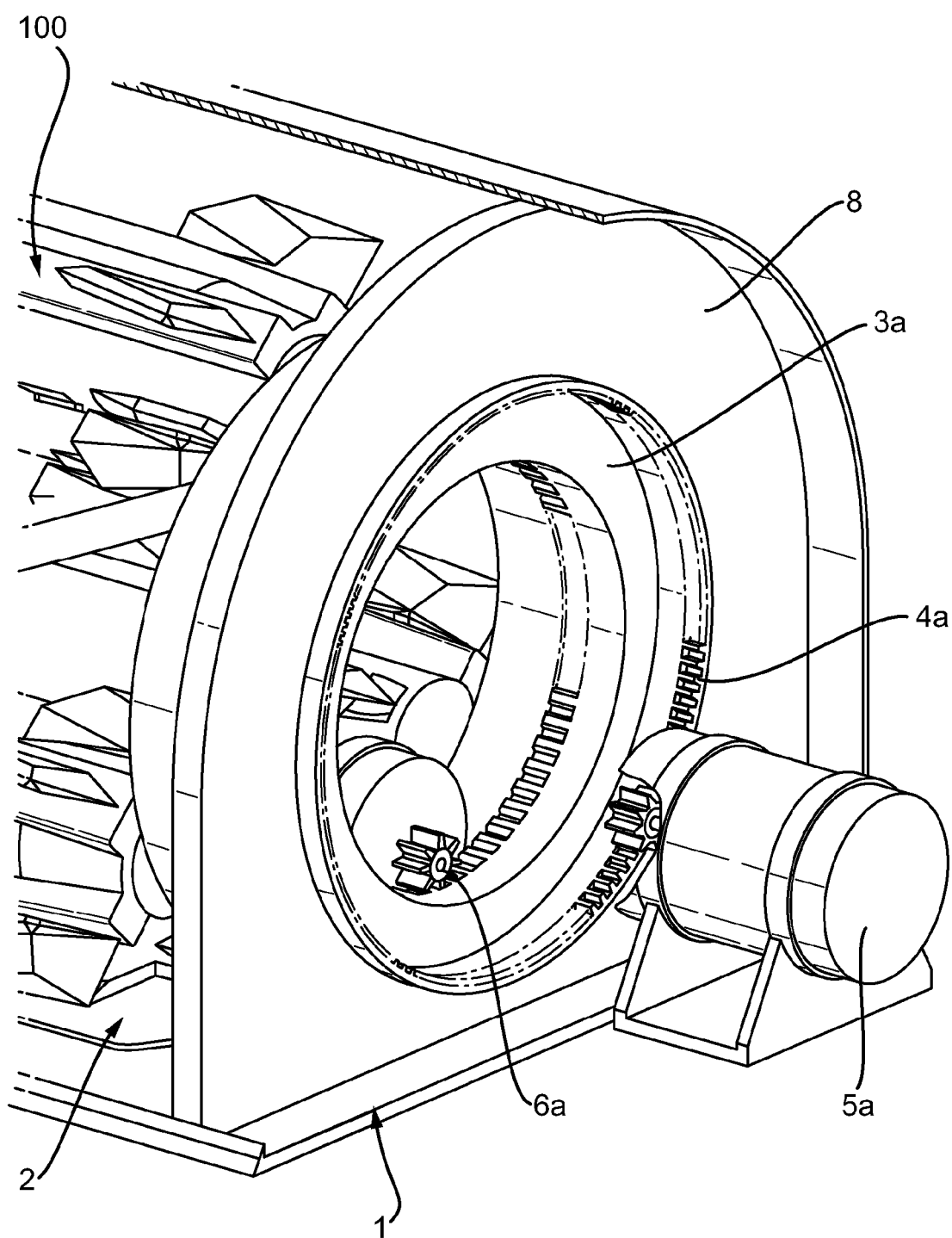
FIG. 1c is a perspective view of the payload mechanism in the closed configuration.
Figure 2A:
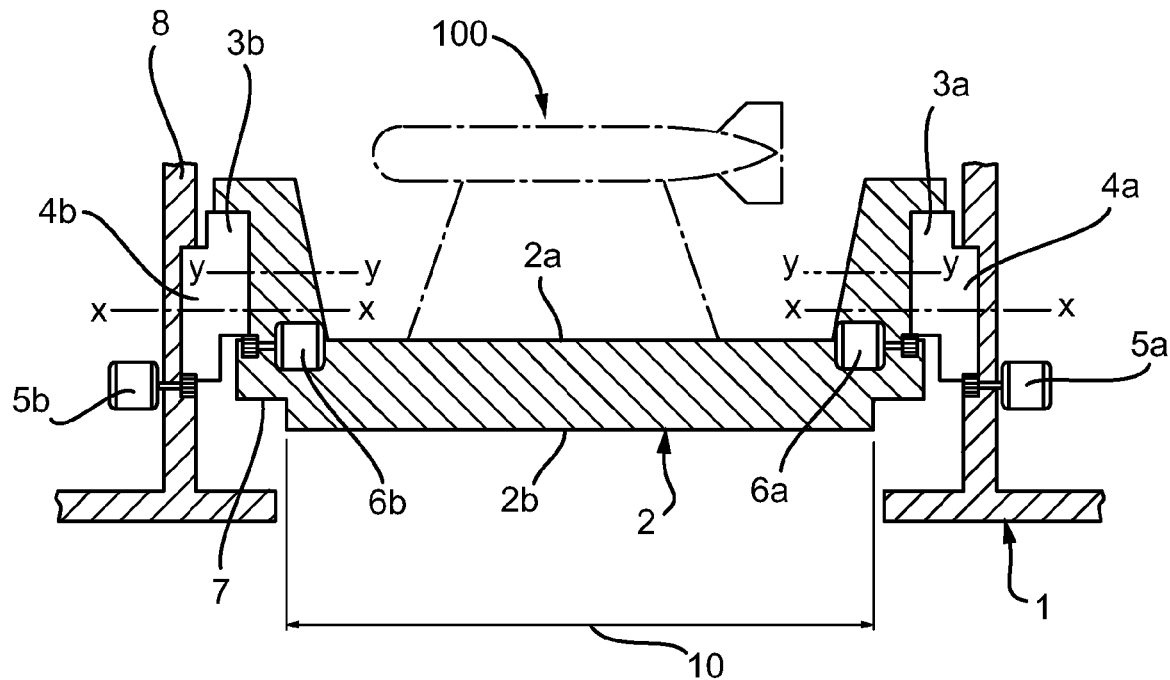
FIGS. 2a and 2b are cross-sectional views through the side and end of the payload mechanism respectively when it is in an intermediate configuration.
Figure 2B:
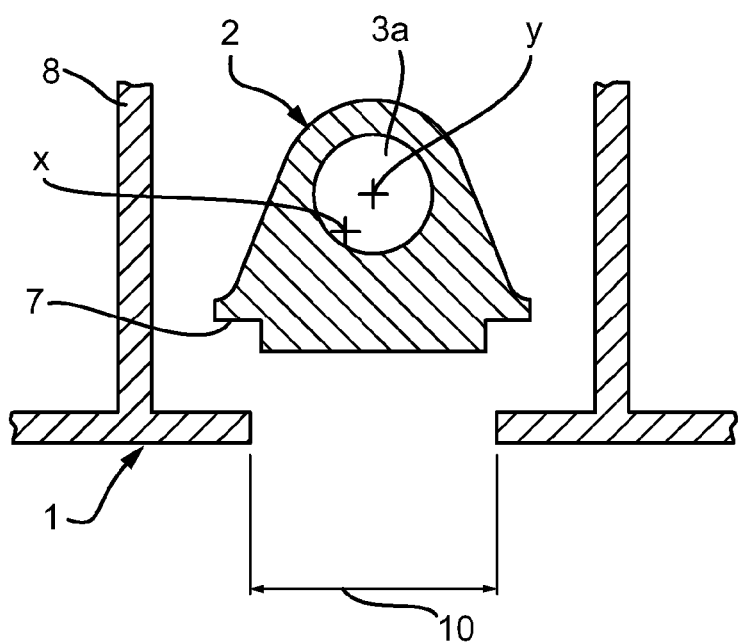
Figure 2C:
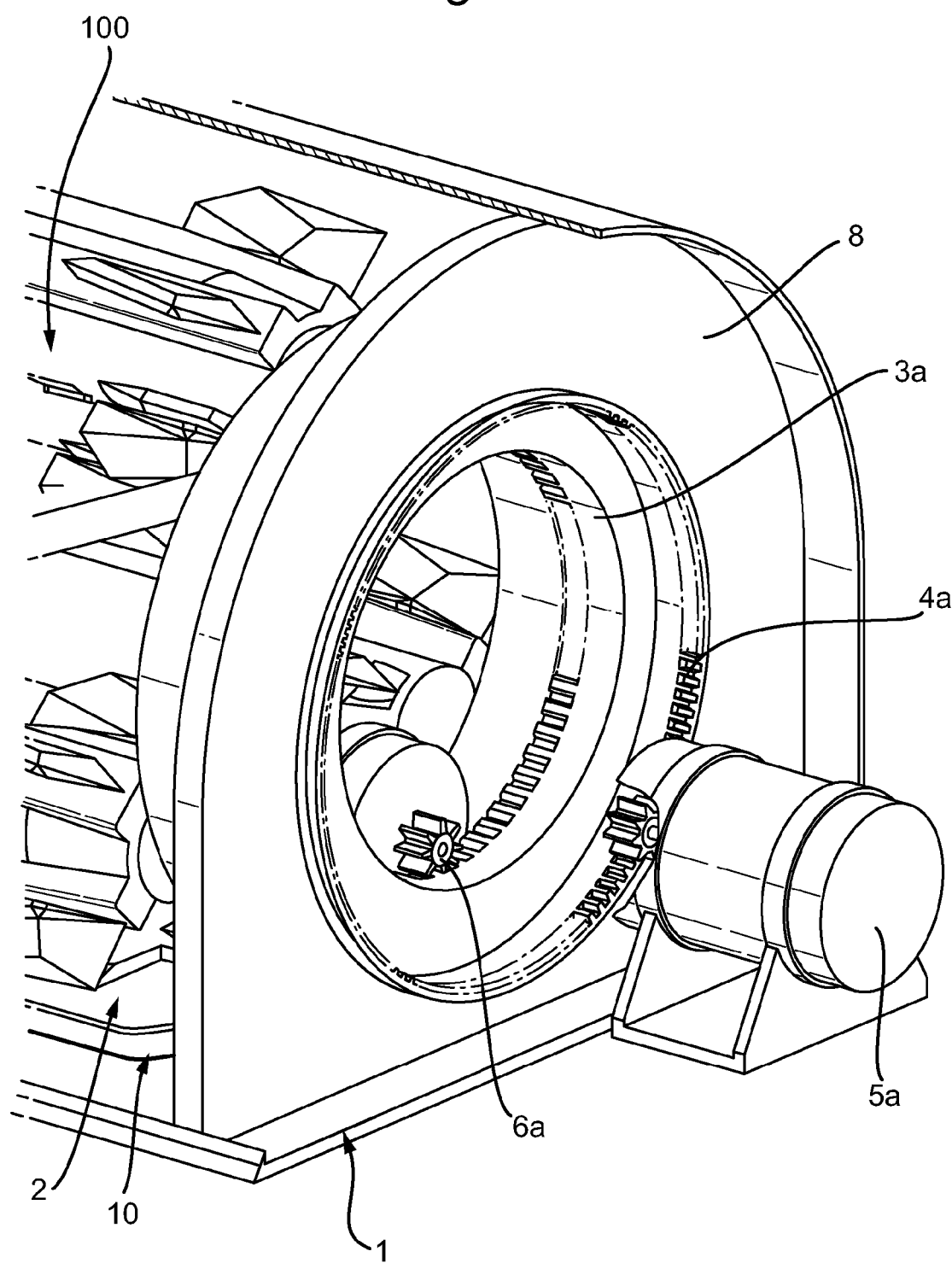
FIG. 2c is a perspective view of the payload mechanism in the intermediate configuration.
Figure 3A:
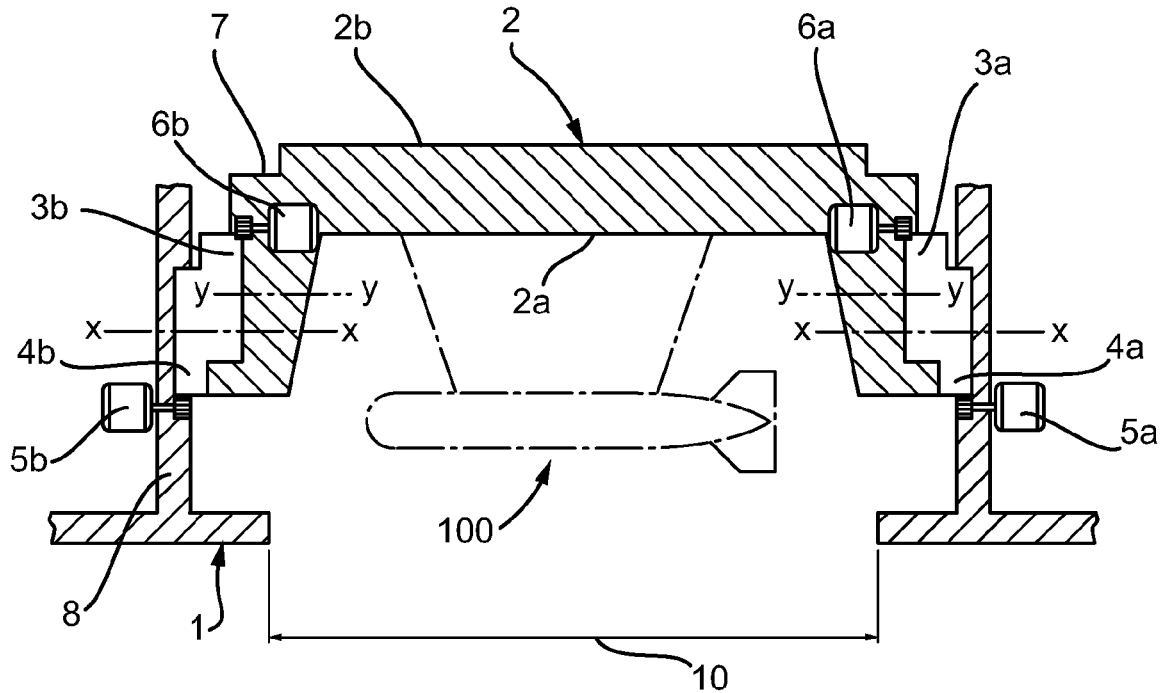
FIGS. 3a and 3b are cross-sectional views through the side and end of the payload mechanism respectively when it is in an open configuration.
Figure 3B:
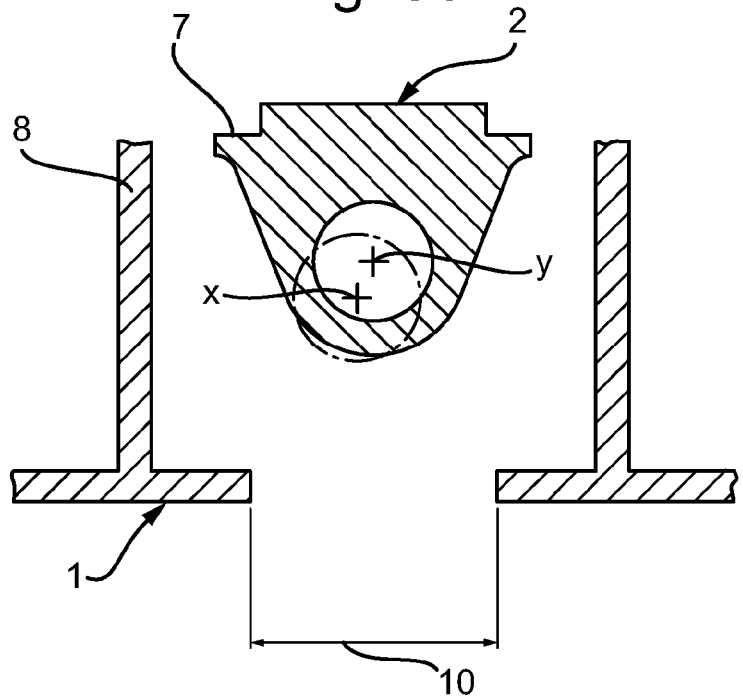
Figure 3C:
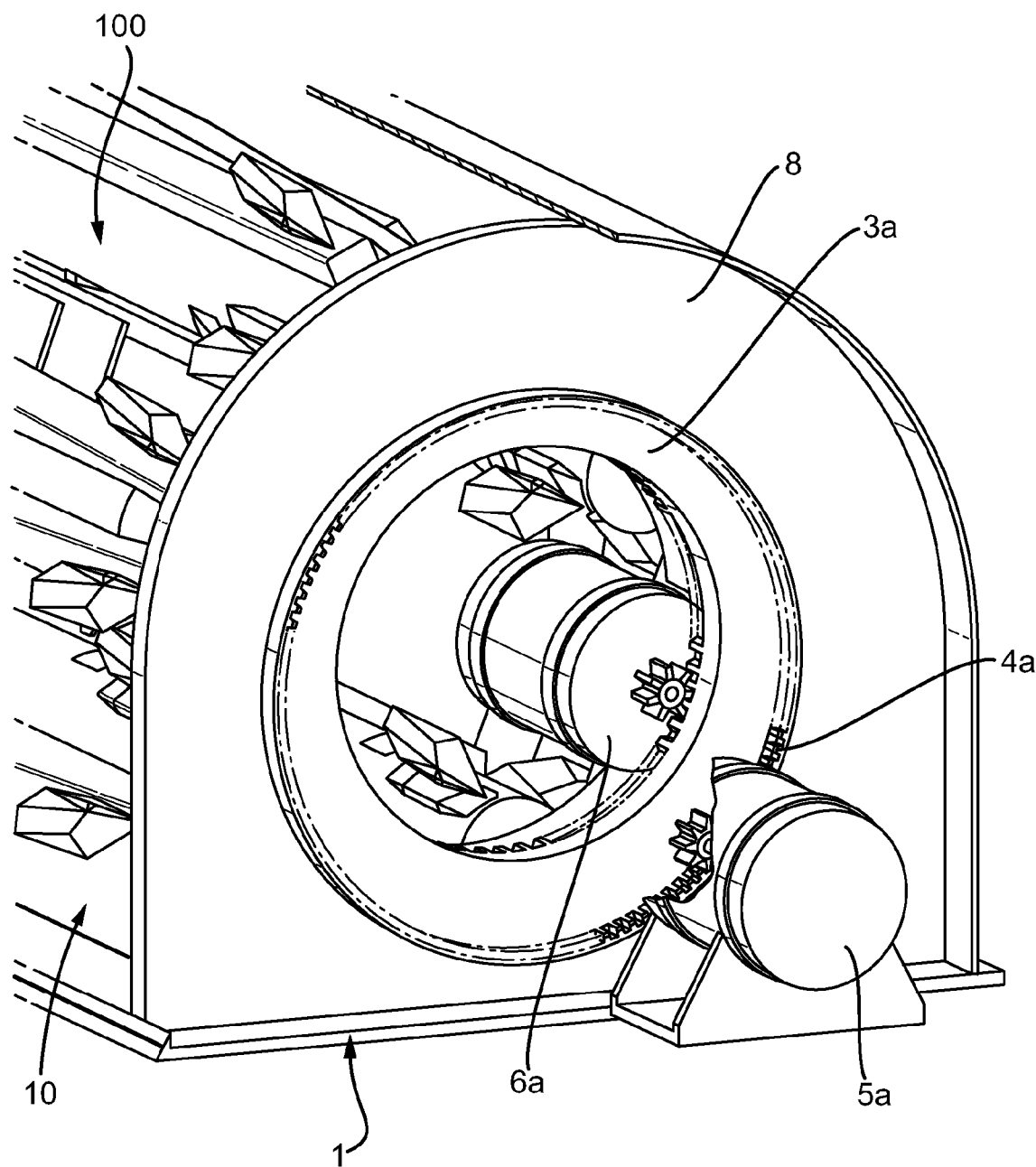
FIG. 3c is a perspective view of the payload mechanism in the open configuration.

The relationship between the first and second bearings 3*a*, 4*a*, the door 2 support member and the wall 8 of the recess (or a separate frame in other embodiments) is demonstrated in FIGS. 1*c*, 2*c* and 3*c*. Here, it can be seen that the first bearing unit having the first bearing 3*a* and second bearing 4*a* is coupled to the support member of the door 2 such that the door 2 can rotate about the axis of rotation y of the first bearing 3*a* and the door 2 and the first bearing unit can rotate.

The payload mechanism comprises a processor for operating the motors 5*a*, 5*b*, 6*a*, 6*b* to drive the bearings 3*a*, 3*b*, 4*a*, 4*b* in the correct sequence to open or close the door 2 (i.e. to expose or inter the payload 100, respectively). The processor may be embedded in the door 2, the removable frame, or within the body 1 of the vehicle.

The vehicle may include a user-operable switch to instruct the processor to activate the motors 5*a*, 5*b*, 6*a*, 6*b* to translate the door 2 between the open configuration and closed configuration, or vice versa. For example, to open the weapons bay of an aircraft to expose a payload 100 for release or operation, the cockpit of the aircraft may have a pilot-operable button or switch. The button or switch, when operated, causes a signal to be sent to the processor instructing it to operate the bearings 3*a*, 3*b*, 4*a*, 4*b* in the correct sequence to open or close the door 2.

In an alternative embodiment, the payload mechanism may be activated to move between the open and closed configuration, or vice versa by the application of pressure to the door 2. For example, the user may push on the outside surface 2*b* of the door 2 in order to open it or the inside surface 2*a* of the door 2 in order to close it. Here, one or more of the motors 5*a*, 5*b*, 6*a*, 6*b* may be arranged to detect an external driving force causing their spindles to rotate. A signal is then be sent to the processor to cause the bearings 3*a*, 3*b*, 4*a*, 4*b* to be operated in the correct sequence to open or close the door 2.

The mechanism, in some embodiments, includes at least one local lock for selectively preventing or allowing rotation of the second bearing 4*a* and fourth bearing 4*b*. In other words, the bearing unit is selectively prevented or allowed to rotate about the axis of the second and fourth bearings 4*a*, 4*b*. The local lock may comprise a disc brake or clamp attached to the second bearing 4*a* and/or fourth bearing 4*b*, or the wall 8 the respective bearings 4*a*, 4*b* are coupled to, to prevent rotation of the first and second bearing units relative to the recess. Alternatively, the at least one local lock may be a function or feature of the third motor 5*a* and/or fourth motor 5*b* (i.e. the motors within the recess). The local lock may be a software step undertaken by the processor to prevent rotation of the second bearing 4*a* and fourth bearing 4*b* by preventing rotation of the respective motor spindles. In further embodiments, the motors 5*a*, 5*b* are arranged to lock, i.e. not freely rotate, unless activated by the processor, as previously described with respect to the reduction gear arrangement.

Operation of the processor will now be described with reference to FIGS. 1*a*, 1*b*, 2*a*, 2*b*, 3*a* and 3*b*.

The process starts with the payload mechanism in the closed configuration. In other words, the door 2 is seated to fill the aperture 10. This is shown in FIGS. 1*a* and 1*b*. When it is desired to release a payload 100, or make a payload 100 accessible, the processor moves the payload mechanism through an intermediate configuration to an open configuration. This may be done in discrete steps, or in one continuous movement.

FIGS. 2*a* and 2*b* show respectively side and end views of the payload mechanism of FIGS. 1*a* and 1*b*, this time in an intermediate configuration. That is to say, FIGS. 2*a* and 2*b* show the payload mechanism in a configuration between the closed configuration and the open configuration.

In the first part of operation, first bearing 3*a* and second bearing 4*a* (i.e. a first pair of bearings forming the first bearing unit) are driven in a synchronised contra-rotation. Simultaneously, third bearing 3*b* and fourth bearing 4*b* (i.e. a second pair of bearings forming the second bearing unit) are driven in the same synchronised contra-rotation, where the first bearing 3*a* and third bearing 3*b* are rotated in the same direction as each other. For example, the first bearing 3*a* and third bearing 3*b* are rotated clockwise, and simultaneously the second bearing 4*a* and fourth bearing 4*b* are rotated counterclockwise. If engaged, local locks will disengage to allow this synchronised contra-rotation. All four drive motors 5*a*, 5*b*, 6*a*, 6*b* are then powered to drive the first to fourth bearings 4*a*, 4*b*, 3*a*, 3*b*.

As the rotation centres of these pairs of bearings in each bearing unit are offset from each other, a displacement of the rotary door 2 occurs without rotation relative to the aperture 10. In other words, the outside surface 2*b* of the door 2 is moved away from the aperture 10 in an arc around the axis of rotation x of the second bearing 4*a*. The arc is described by a radius which is the offset distance between the axis of rotation x of the second bearing 4*a* and the axis of rotation y of the first bearing 3*a*. The rotary door 2 is thus lifted clear of the contact face of the body 1 around the perimeter of the aperture 10 (i.e. the door frame). The processor stops the operation of the motors 5*a*-6*b* when the axis of rotation y of the first bearing 3a is raised sufficiently for all elements of the rotary door 2 to rotate about axis y without clashing with the aperture 10 frame.

FIGS. 3a and 3b show the payload mechanism in the open configuration. To attain this configuration from the intermediate configuration shown in FIGS. 2a and 2b, the door 2 is rotated about the axis of rotation y of the first and third bearings 3a, 3b such that the payload 100 faces the environment surrounding the vehicle. The second bearing 4a and fourth bearing 4b are locked in position, and the first and second motors 6a, 6b are driven to move around the inside of the respective first and third bearings 3a, 3b to rotate the door 2 to a desired angle (attitude) relative to the direction of travel of the vehicle. For example, the door 2 may be driven to rotate about the axis of rotation y such that the plane of the inside surface 2a of the door 2 is inverted relative to its position in the closed configuration and generally parallel with the plane of the aperture 10. In other words, where the vehicle is an aircraft and the payload 100 is an antenna, the door 2 may be rotated such that the longitudinal axis of the antenna is orthogonal to the plane of the aperture 10.

Comparing FIGS. 1c, 2c and 3c demonstrates how the door 2 is raised away from the aperture 10 and rotated out of view.

In a further step, not shown, the door 2 may then be moved back toward the aperture 10 firstly by unlocking the second and fourth bearings 4a, 4b. The first bearing 3a, second bearing 4a, third bearing 3b and fourth bearing 4b are then driven simultaneously at equal angular rates of motion. The first bearing 3a and second bearing 4a are driven in opposite directions to each other, and the third 3b and the fourth bearing 4b are driven in opposite directions to each other. The directions of motion are respectively opposite those described with reference to FIGS. 2a and 2b. In other words, if the first bearing 3a and third bearing 3b are driven in a clockwise direction to move the door 2 away from the aperture, they are driven in a counterclockwise direction to move the door 2 closer to the aperture 10. This effectively closes the aperture 10 with the payload 100 exposed.

Reversal of these processing steps described with reference to FIGS. 2a, 2b, 3a and 3b will restore the door 2 to the closed configuration shown in FIGS. 1a and 1b. In other words, to close the door 2, the processor is configured to rotate the door 2 such that its inside surface 2a faces the inside of the body 1 of the vehicle and lower the door 2 toward the aperture 10 such that the land 7 makes contact with the edges of the aperture 10.

Hereinabove, open and closed configurations are referred to. These configurations relate to the state of the door 2, rather than whether or not passage can be made through the aperture 10. In other words, in the open configuration, the aperture 10 may be effectively closed, but the door 2 has been opened to expose the payload 100. The closed configuration is whereby the payload 100 is contained within the body 1 of the vehicle and is not exposed to the environment around the vehicle.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims.

Moreover, it is to be understood that such optional integers or features, while of possible benefit in some embodiments of the disclosure, may not be desirable, and can therefore be absent, in other embodiments.

What is claimed is:

1. A payload mechanism for a vehicle, the payload mechanism comprising:
    a door operable to be in a closed configuration or an open configuration within a recess of the vehicle, the recess having an aperture;
    a first bearing unit (15) comprising a first bearing (3a) and a second bearing (4a), the first bearing unit (15) coupled to one end of the door such that the door rotates about an axis of rotation of the first bearing (3a) and wherein the first bearing unit (15) rotates about an axis of rotation of the second bearing (4a), wherein the axis of rotation of the first bearing (3a) is offset from the axis of rotation of the second bearing (4a);
    a drive unit arranged to selectively drive either:
        the first bearing (3a) and the second bearing (4a) simultaneously at opposite and equal angular rates of motion to rotate the door in a first direction about the axis of rotation of the first bearing (3a) and to rotate the first bearing unit (15) in a second direction about the axis of rotation of the second bearing (4a) to move the door closer to or away from the aperture, or
        the first bearing (3a) but not the second bearing (4a) to rotate the door about the axis of rotation of the first bearing (3a); and
    comprising a controller configured to move the door from the closed configuration to the open configuration by performing the steps of:
        driving the first bearing (3a) and second bearing (4a) simultaneously at opposite and equal angular rates of motion to rotate the door in the first direction about the axis of rotation of the first bearing (3a) and to rotate the first bearing unit (15) in the second direction about the axis of rotation of the second bearing (4a), such that the door is moved away from the aperture, and
        driving the first bearing (3a) but not the second bearing (4a) to rotate the door about the axis of rotation of the first bearing (3a).

2. The payload mechanism according to claim 1, wherein the drive unit comprises a first motor for driving the first bearing and a second motor for driving the second bearing.

3. The payload mechanism according to claim 1, wherein the controller is further configured to perform the step of locking the second bearing such that the first bearing unit cannot rotate about the axis of rotation of the second bearing.

4. The payload mechanism according to claim 1, further comprising:
    a second bearing unit (20) comprising third and fourth bearings, the second bearing unit (20) coupled to the opposite end of the door, wherein the axis of rotation of the third bearing is arranged coaxially with the axis of rotation of the first bearing and wherein the axis of rotation of the fourth bearing is arranged coaxially with the axis of rotation of the second bearing,
    wherein the drive unit is arranged to selectively drive either:
        the first bearing and the second bearing simultaneously at opposite and equal angular rates of motion and the third bearing and the fourth bearing simultaneously at opposite and equal angular rates of motion to move the door closer to or away from the aperture, the angular rate of motion of the third bearing is the same as the angular rate of motion of the first bearing, or the first bearing simultaneously with the third bearing, but not the second bearing or the fourth bearing, to rotate the door about the axis of rotation of the first bearing and the third bearing.

5. The payload mechanism according to claim 1, wherein the inside surface of the door comprises a payload, wherein in the closed configuration the inside surface of the door faces the inside of the vehicle and in the open configuration the inside surface of the door faces an environment outside of the vehicle.

6. The payload mechanism according to claim 5, wherein the payload is a sensor or a munition.

7. The payload mechanism according to claim 1, wherein the door comprises:
a land for engaging with the body of the vehicle when the door is in the closed configuration;
an inside surface; and
an outside surface,
wherein, in the closed configuration, the outside surface of the door is flush with an outside surface of the body.

8. A vehicle comprising:
a body having a recess, the recess comprising an aperture; and
the payload mechanism according to claim 1, wherein the payload mechanism is disposed inside or integrated with the recess.

9. The vehicle according to claim 8, wherein the recess is a weapons bay of an aircraft.

10. A method of operating a payload mechanism according to claim 1 to expose a payload, the method comprising:
driving the first bearing and second bearing simultaneously at opposite and equal angular rates of motion to rotate the door in the first direction about the axis of rotation of the first bearing; and
in the second direction about the axis of rotation of the second bearing to move the door away from the aperture; and
driving the first bearing but not the second bearing to rotate the door about the axis of rotation of the first bearing.

11. The method according to claim 10, wherein driving the first bearing comprises driving a first motor, and wherein driving the second bearing comprises driving a second motor.

12. The method according to claim 10, comprising locking the second bearing such that the first bearing unit cannot rotate about the axis of rotation of the second bearing.

13. The method according to claim 12, wherein locking the second bearing comprises preventing rotation of the second motor.

14. The method according to claim 10, comprising:
driving the first bearing and the second bearing simultaneously at opposite and equal angular rates of motion and the third bearing and the fourth bearing simultaneously at opposite and equal angular rates of motion to move the door away from the aperture, wherein the angular rate of motion of the third bearing is the same as the angular rate of motion of the first bearing; and
driving the first bearing simultaneously with the third bearing but not the second or fourth bearings to rotate the door about the axis of rotation of the first and third bearings.

15. A method of operating a payload mechanism according to claim 1 to inter a payload within the body of a vehicle, the method comprising:
driving the first bearing but not the second bearing to rotate the door about the axis of rotation of the first bearing; and
driving the first bearing and the second bearing simultaneously at opposite and equal angular rates of motion to rotate the door in the second direction about the axis of rotation of the first bearing and to rotate the first bearing unit in the first direction about the axis of rotation of the second bearing to move the door closer to the aperture.

16. The method according to claim 15, wherein driving the first bearing comprises driving a first motor, and wherein driving the second bearing comprises driving a second motor.

17. The method according to claim 15, comprising unlocking the second bearing to allow the first bearing unit to rotate about the axis of rotation of the second bearing.

18. The method according to claim 17, wherein unlocking the second bearing comprises allowing rotation of the second motor.

19. The method according to claim 15, comprising:
driving the first bearing simultaneously with the third bearing but not the second or fourth bearings to rotate the door about the axis of rotation of the first and third bearings; and
driving the first bearing and the second bearing simultaneously at opposite and equal angular rates of motion and the third bearing and the fourth bearing simultaneously at opposite and equal angular rates of motion to move the door closer to the aperture, wherein the angular rate of motion of the third bearing is the same as the angular rate of motion of the first bearing.

* * * * *